US005865455A

United States Patent [19]

[11] Patent Number: 5,865,455

[45] Date of Patent: Feb. 2, 1999

Taylor

[54] WHEELCHAIR

[76] Inventor: William Gregory Taylor, 10523 Arbor Bluff, San Antonio, Tex. 78240

[21] Appl. No.: 710,878

[22] Filed: Sep. 23, 1996

Related U.S. Application Data

[63] Continuation-in-part of Ser. No. 406,464, Aug. 2, 1995, abandoned.

[51] Int. Cl.[6] ........ B62M 1/16

[52] U.S. Cl. ........ 280/250.1; 280/238; 280/246; 188/2 F

[58] Field of Search ........ 280/250.1, 304.1, 280/236, 237, 238, 242.1, 244, 246, 249, 253, 255, 258, 248; 188/2 D, 2 F, 24.11, 24.12

[56] References Cited

U.S. PATENT DOCUMENTS

| | | | |
|---|---|---|---|
| 3,994,509 | 11/1976 | Schaeffer | 280/244 |
| 4,316,616 | 2/1982 | Boivin | 280/250.1 |
| 4,560,181 | 12/1985 | Herron | 280/250.1 |
| 4,705,284 | 11/1987 | Stout | 280/282 |
| 4,735,431 | 4/1988 | Tait | 280/250.1 |
| 4,865,344 | 9/1989 | Romer et al. | 280/304.1 |
| 5,020,818 | 6/1989 | Oxford | 280/250.1 |
| 5,291,972 | 3/1994 | Griffith | 188/265 |
| 5,499,833 | 3/1996 | Her et al. | 280/250.1 |
| 5,632,499 | 5/1997 | Hutcherson | 280/250.1 |

*Primary Examiner*—Anne Marie Boehler
*Attorney, Agent, or Firm*—Miller, Sisson, Chapman & Nash

[57] ABSTRACT

This wheelchair employs the use of push levers attached to drive gear sprockets, which propel the main rear wheels of the chair through bicycle chains connecting the front sprockets to gear clusters mounted on the rear wheel axles. Ratchet mechanisms allow each push lever to transmit power in either a forward or reverse direction. Derailers are mounted over the rear axles and are activated by shifter mechanisms mounted on the push levers. Calliper-type wheel brakes are mounted on the frame beside each wheel and activated by hand brake levers mounted on the push levers.

9 Claims, 13 Drawing Sheets

WHEELCHAIR

This is a continuation-part of U.S. application Ser. No. 08/406,464, filed Aug. 2, 1995, now abandoned.

BACKGROUND OF THE INVENTION

1) Field of the Invention

This invention relates to a user-propelled vehicle or wheelchair. More particularly it refers to a wheelchair propelled by push levers connected to drive wheels with bicycle chains and variable ratio rear gear clusters.

2) Description of Prior Art

Most wheelchair users have little or no functional use of their lower extremities, but have preserved normal upper body function. Accordingly, the conventional wheelchair requires the user to propel the chair by repetitively pushing on push-rims attached to the main wheels of the chair. The arm and shoulder motions that are required are undesirable because they utilize the small, relatively weak, muscles of the rotator cuff and ultimately lead to stress injury and degenerative arthritis of the shoulder joint. This is also an inefficient means of locomotion; providing only a one-to-one ratio of distance traveled for distance pushed. It is however an ubiquitous and relatively simple machine, that can be easily mantained. Several attempts have been made to improve on this standard with very limited success.

Several inventions employ the use of levers for the user to push and propel the chair. This is an improvement in making use of the larger and more powerful triceps and pectoral muscles, with reduced shoulder stress. Still, however, all of these devices fall short of success.

U.S. Pat. No. 4,865,344 is inadequate because it provides only one speed, one fixed gear ratio, and thereby forgoes the significant mechanical advantage gained by using a set of multiple gear ratios. This machine also requires the user to steer with hand levers attached to the push levers, increasing the complexity of steering and propulsion movements.

U.S. Pat. No. 5,322,312 is another attempt to propel a chair with a push lever. It also lacks sufficient mechanical advantage, by providing only one gear ratio. The use of a detachable skateboard device makes this machine unnecessarily complex, expensive, and difficult to maintain.

U.S. Pat. No. 5,209,506 is cumbersome in requiring the user to steer with handlebars which are simultaneously pushed and pulled to propel the chair. The linkage required to operate this machine is also too complex for easy care, and the position of the steering/push lever obstructs easy entry and exit of the chair.

U.S. Pat. No. 4,811,964 also uses push levers for power, but in a rowing motion. This machine is difficult to steer with a combined row-steer motion, it has only one speed, and uses a complex system of pulleys and linkage, all of which serve to make it impractical.

U.S. Pat. No. 3,994,509 is another lever-driven machine that makes use of a very complex and expensive system of forward and reverse clutches. It also provides only a singly forward speed, and has a very wide profile, to accommodate the wide-set wheels.

There are several inventions that use a set of bicycle pedals to turn a crank which in turn transfers power via a bicycle chain to either front or rear wheels. All of these hand-crank designs suffer from the fact that the hand cranking motion is extremely fatiguing. They are too big and too heavy. The cranking/steering device obstructs entry and exit. These generally lack multiple gears and are difficult to steer while cranking. U.S. Pat. NO. 4,720,117 is a typical example of this type of machine.

U.S. Pat. No. 5,362,081 is an attempt to adapt the mechanical advantage of multiple gear ratios to the standard wheelchair format. It does not, however, save the user from the repetitive motion injury and degenerative damage to the shoulder joints; and, in using the smaller, weaker rotator cuff muscles, it is more fatiguing than a push lever machine. This particular model also requires the user to let go of the steering/drive wheel to shift gears.

Whereas U.S. Pat. No. 5,020,818 shows a wheeled chair with push levers, ratchets, sprockets and multi-link chains, this machine would not be adaptable to using a derailer mechanism as seen in U.S. Pat. No. 4,316,616 without considerable modification of this machine. U.S. Pat. No. 5,020,818 has two wheels driven by the same chain, and at the same gear ratio. If a derailer were added to one wheel, changing gears would cause each wheel to turn at a different ratio and different speed. This would cause one wheel to constantly drag, making the wheelchair unmovable for all practical purposes. Other modifications to add multiple derailers, multiple chains or additional power sprockets, would render the chair a completely different invention.

SUMMARY OF THE INVENTION

I have invented a wheelchair propulsion apparatus that improves a user's ability to propel a chair with less effort, greater speed, and over a longer duration. The mechanics used in this device decrease the stress on shoulder joints and diminish the degenerative joint disease often accompanying prolonged wheelchair use.

Since the bicycle is the most efficient human powered land vehicle, a wheelchair can be made more efficient by adapting current bicycle technology to be used on a wheelchair.

This chair is propelled through use of two push levers, which the user pushes forward utilizing triceps and pectoralis muscles, instead of with the rotator cuff. Ratchets attached to these levers allow the user to retract the levers to the start position without resistance.

Power is transmitted from the push levers through a bicycle chain to a multi-speed rear wheel. Multiple gear ratios are made possible by shifting the drive chain to different size sprockets with a derailer mechanism.

Turning is accomplished in the same manner that it is done with a standard wheelchair. One wheel is pushed more than the other, or a braking force is applied to one wheel while the other is pushed. Braking is accomplished effectively by using calliper brakes similar to those used on a typical bicycle.

This apparatus provides for the most efficient means of wheelchair propulsion, with significant physiological benefits to the user.

DETAILED DESCRIPTION OF THE INVENTION

Figure 1:
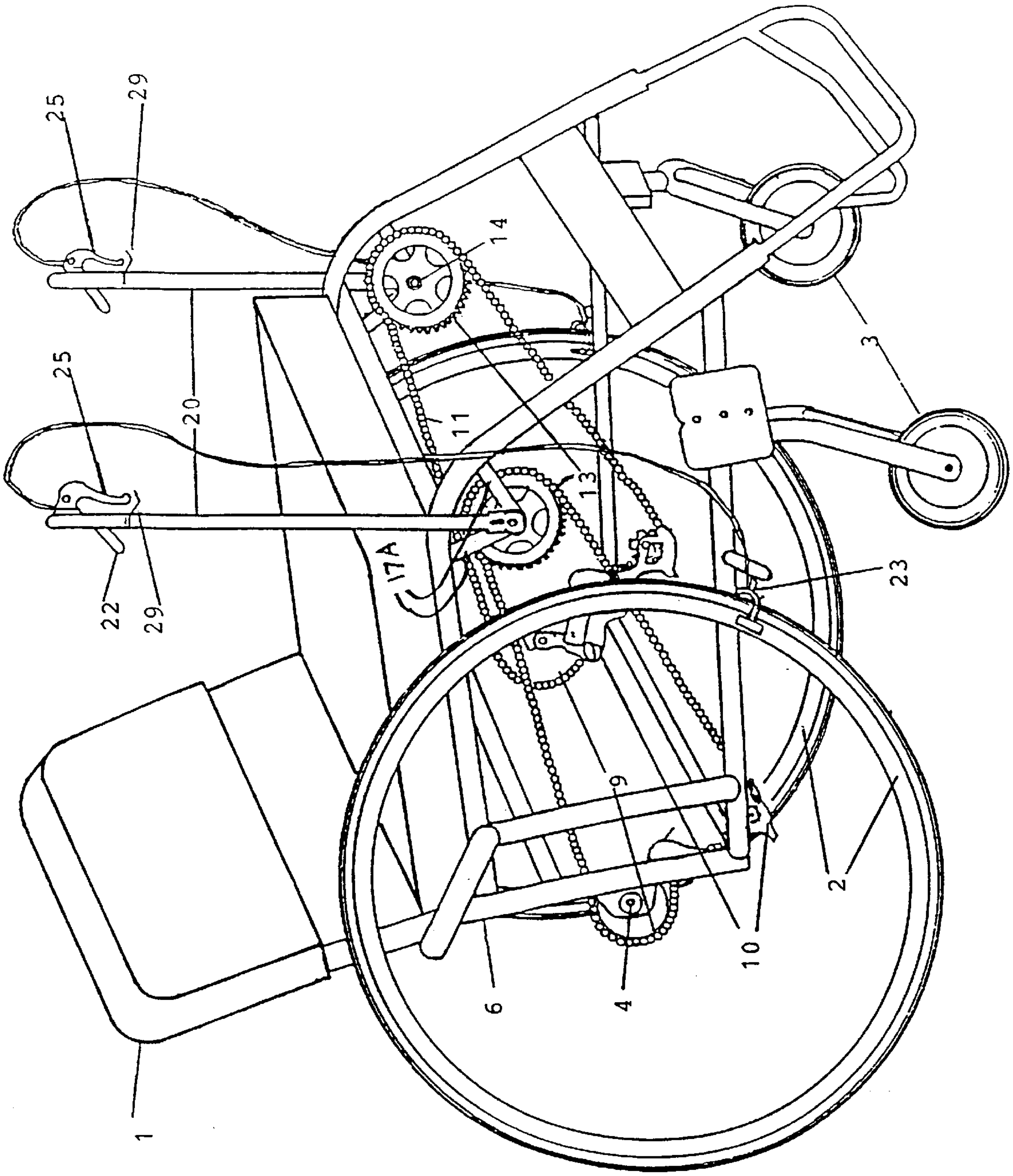
FIG. 1 is a right side view in elevation of the apparatus of this invention.
Figure 2:
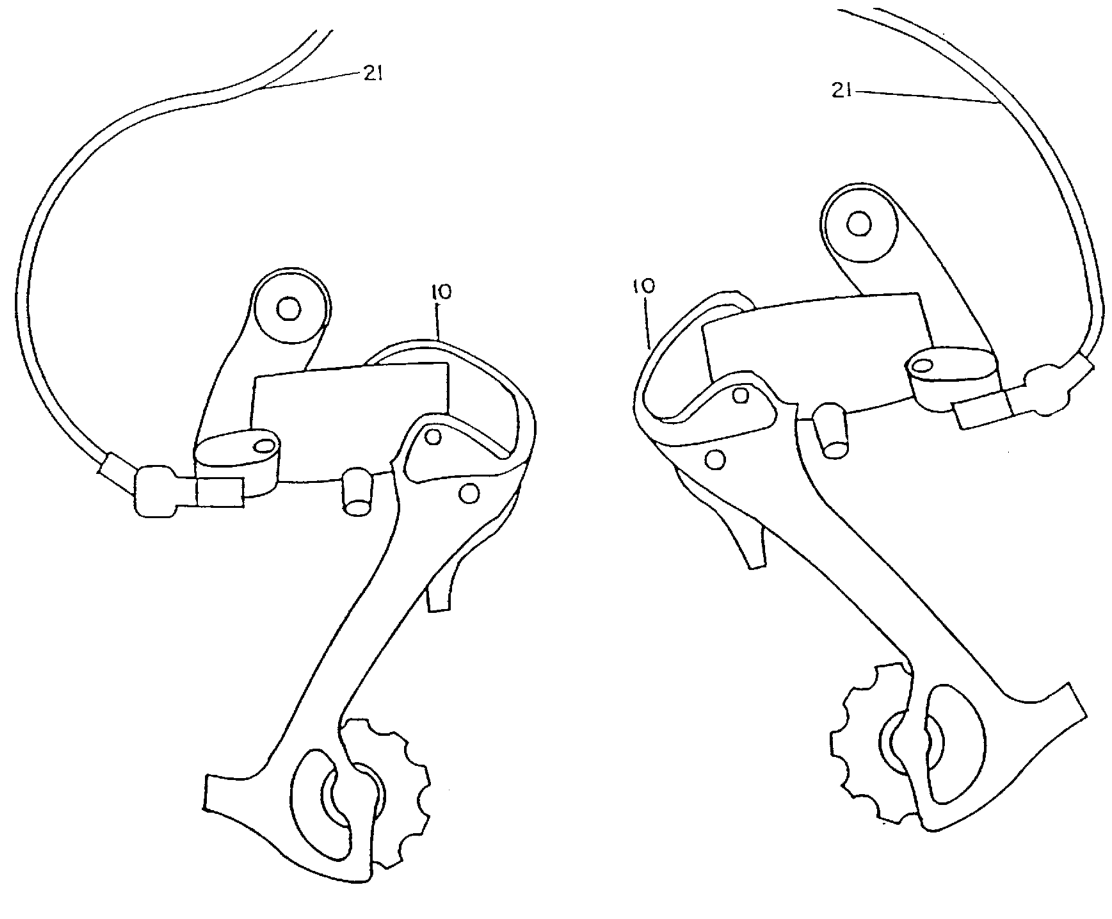
FIG. 2 is a view of left and right derailers showing them to be mirror images of each other.
Figure 3:
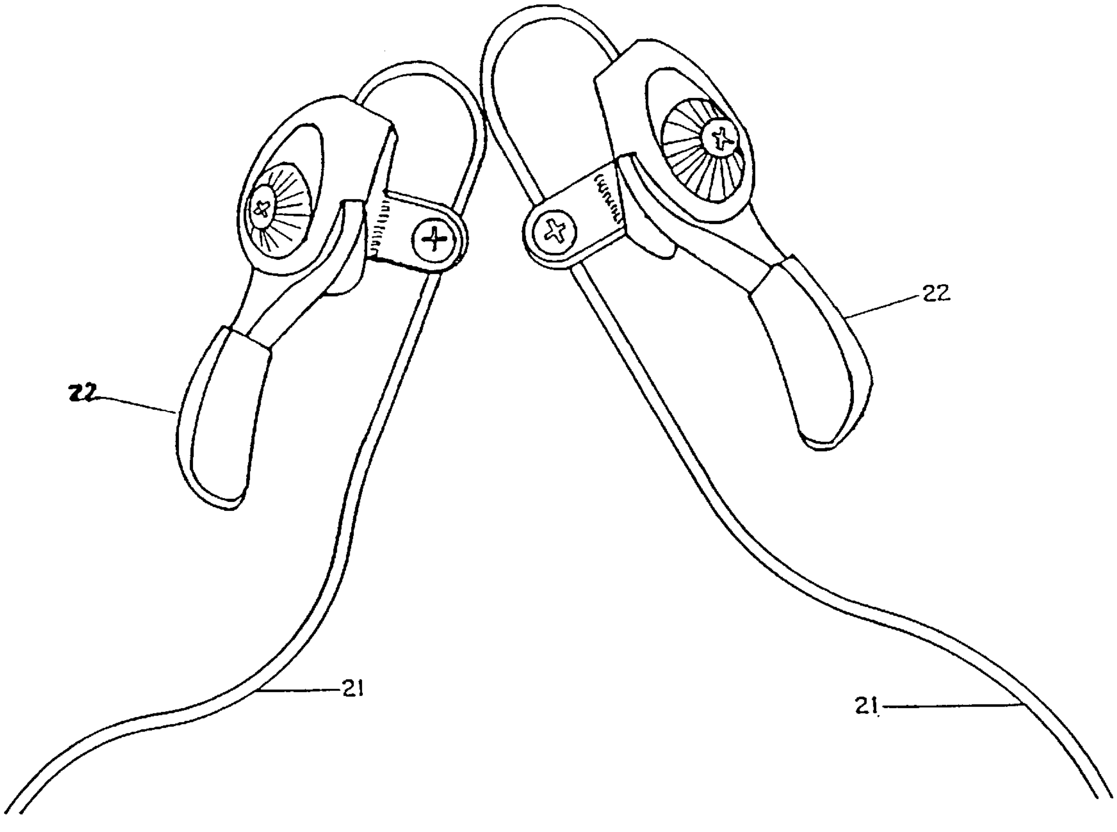
FIG. 3 is a view of left and right shifters showing them to be mirror images of each other.
Figure 4:
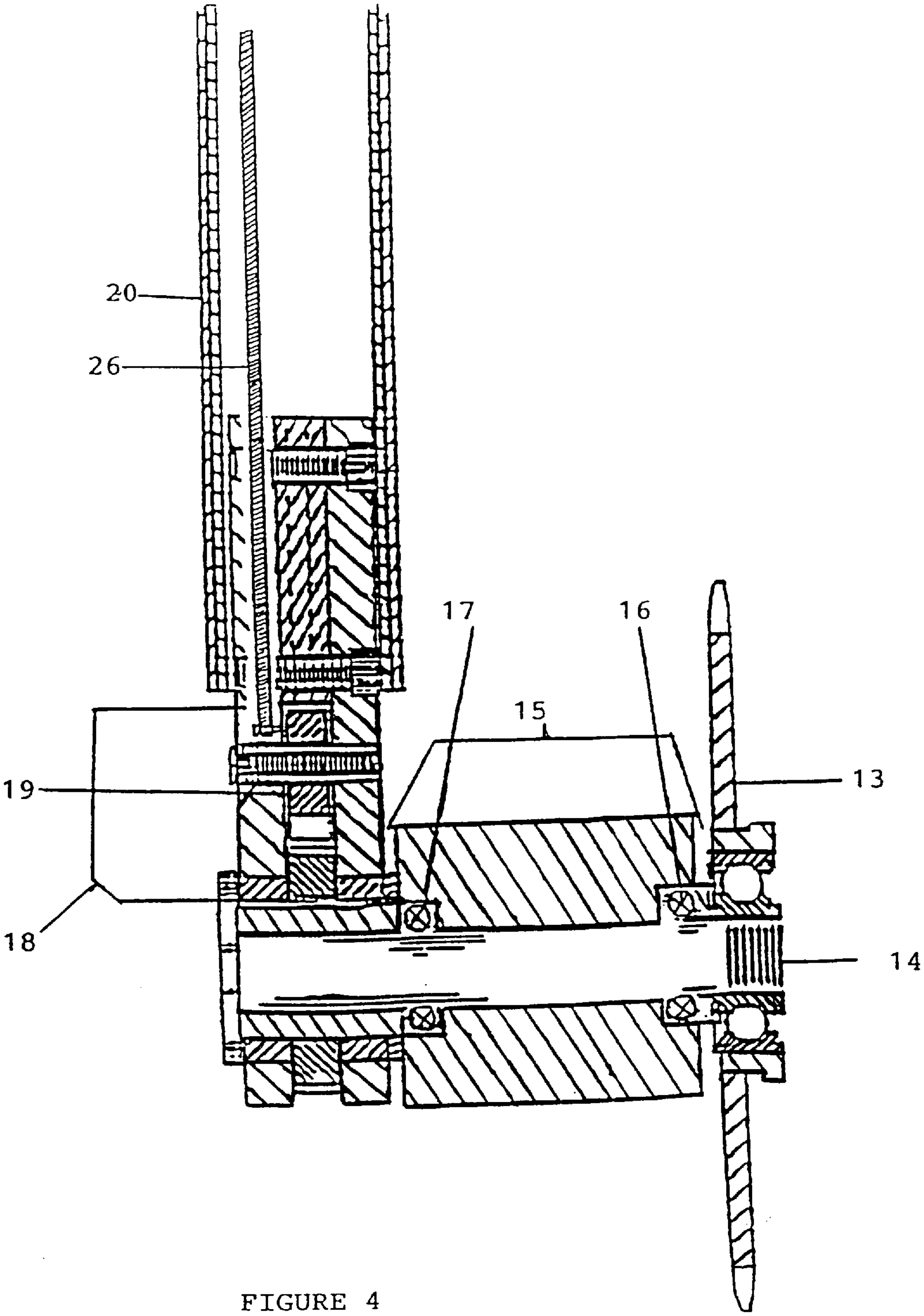
FIG. 4 is a cross section view of the front axle with its attached sprocket, bearing, hub, ratchet and push lever.
Figure 5:
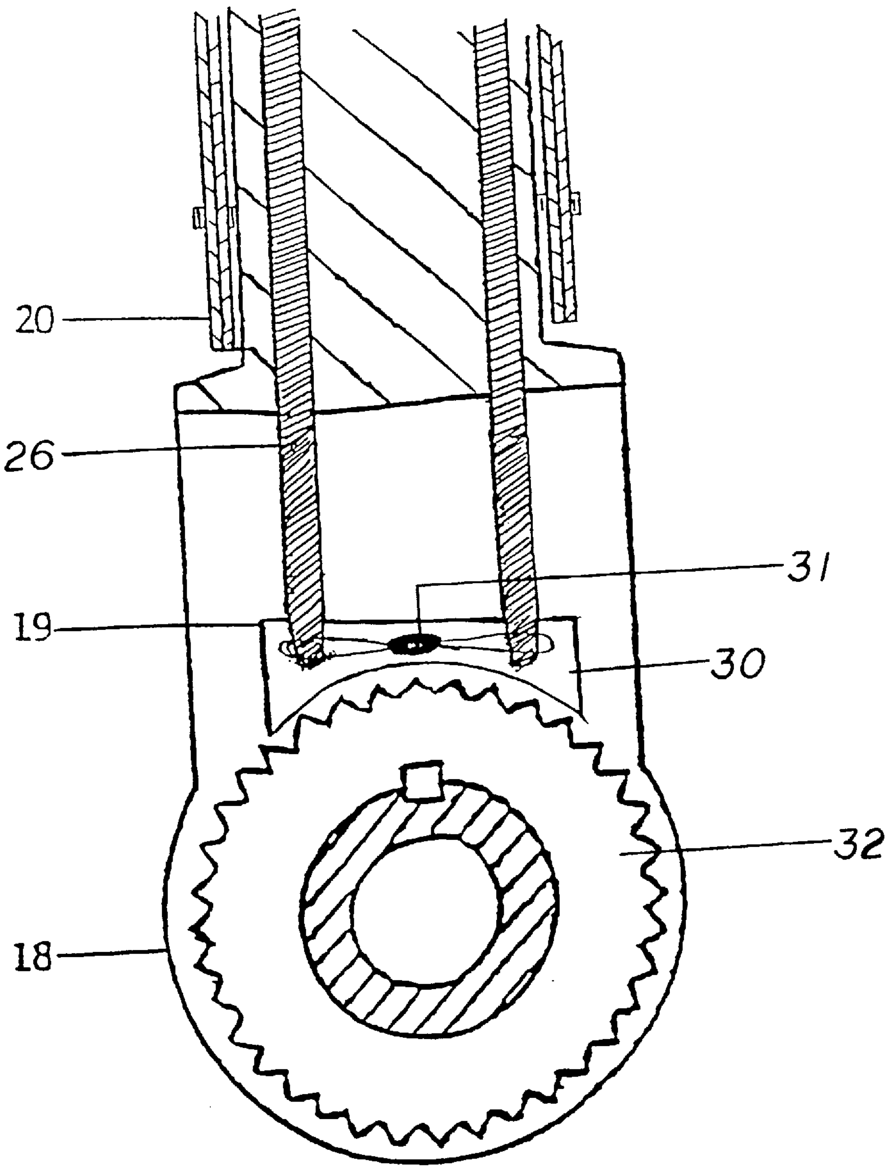
FIG. 5 is a cross section view of the ratchet mechanism showing the pushrods.
Figure 6:
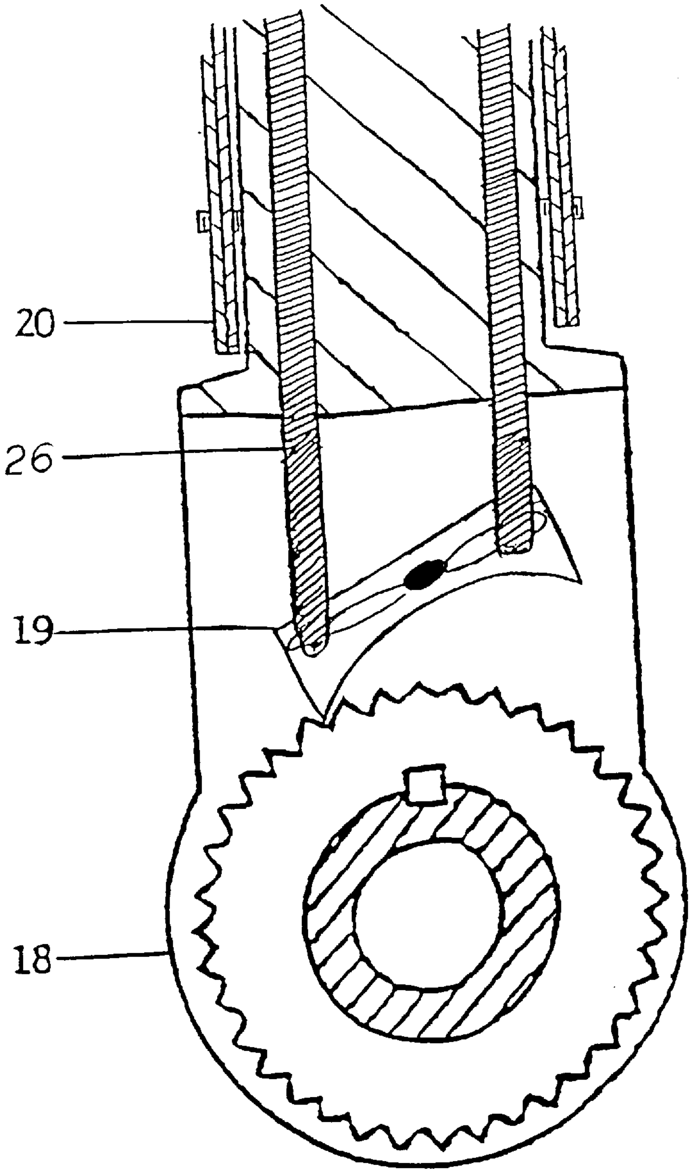
FIG. 6 is a cross section view of the rear axle with its attached gear cluster, bearings, hub, frame upright, and wheel.
Figure 7:
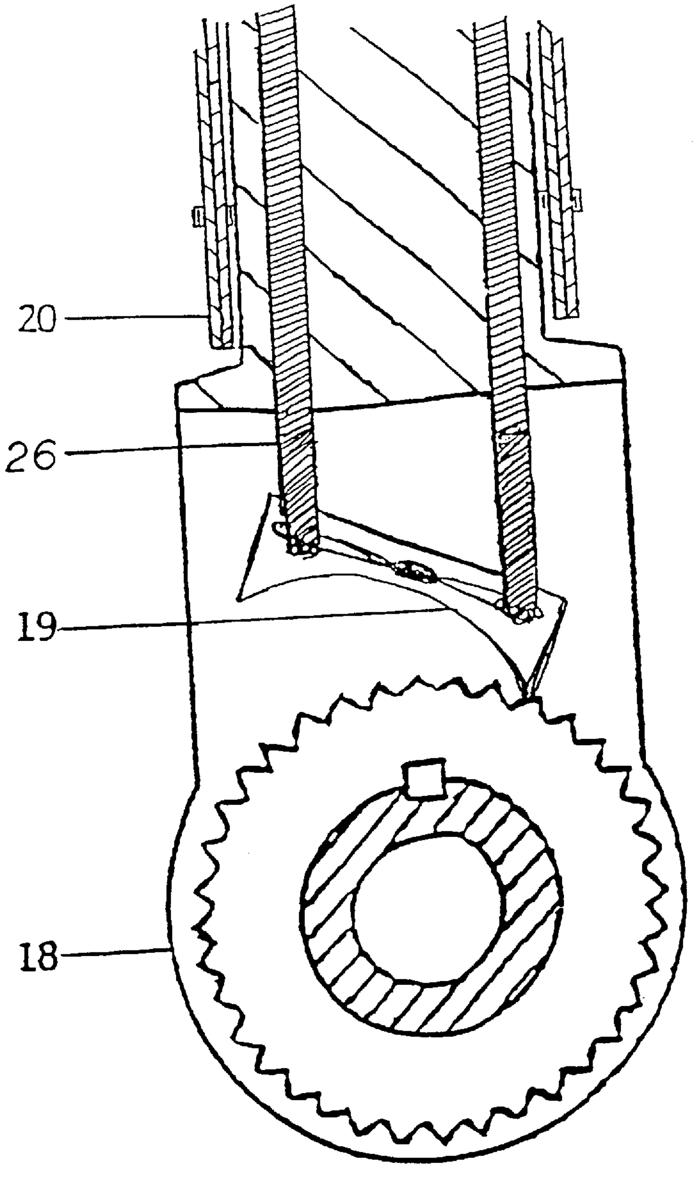
FIG. 7 is a view of the left side of the chair viewed from the center of the chair.
Figure 8:
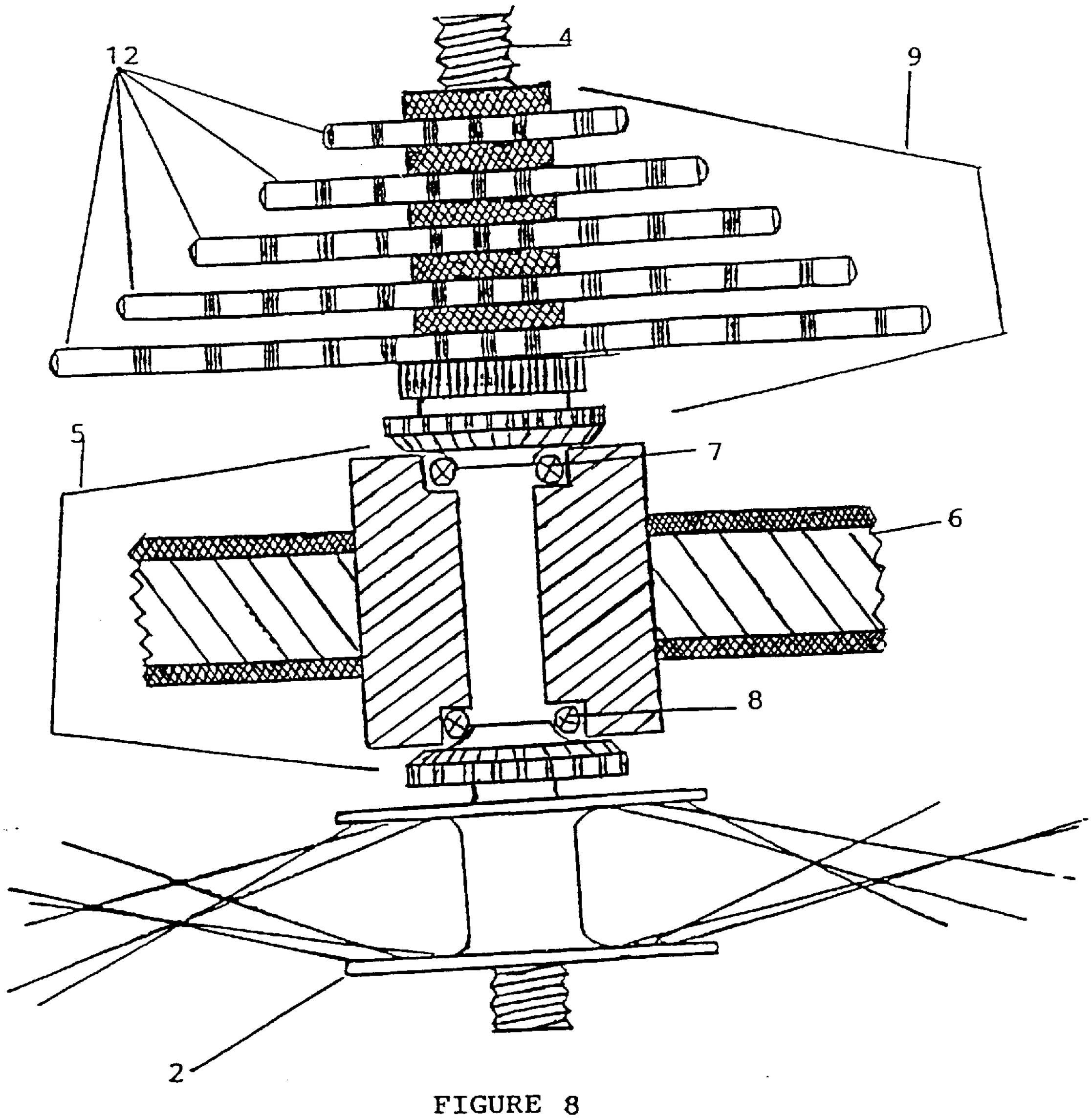
FIG. 8 is a cross section view of the upper end of the push lever showing the rotating hand grip, shifter, hand brake lever, and break lever retaining clip.
Figure 9:
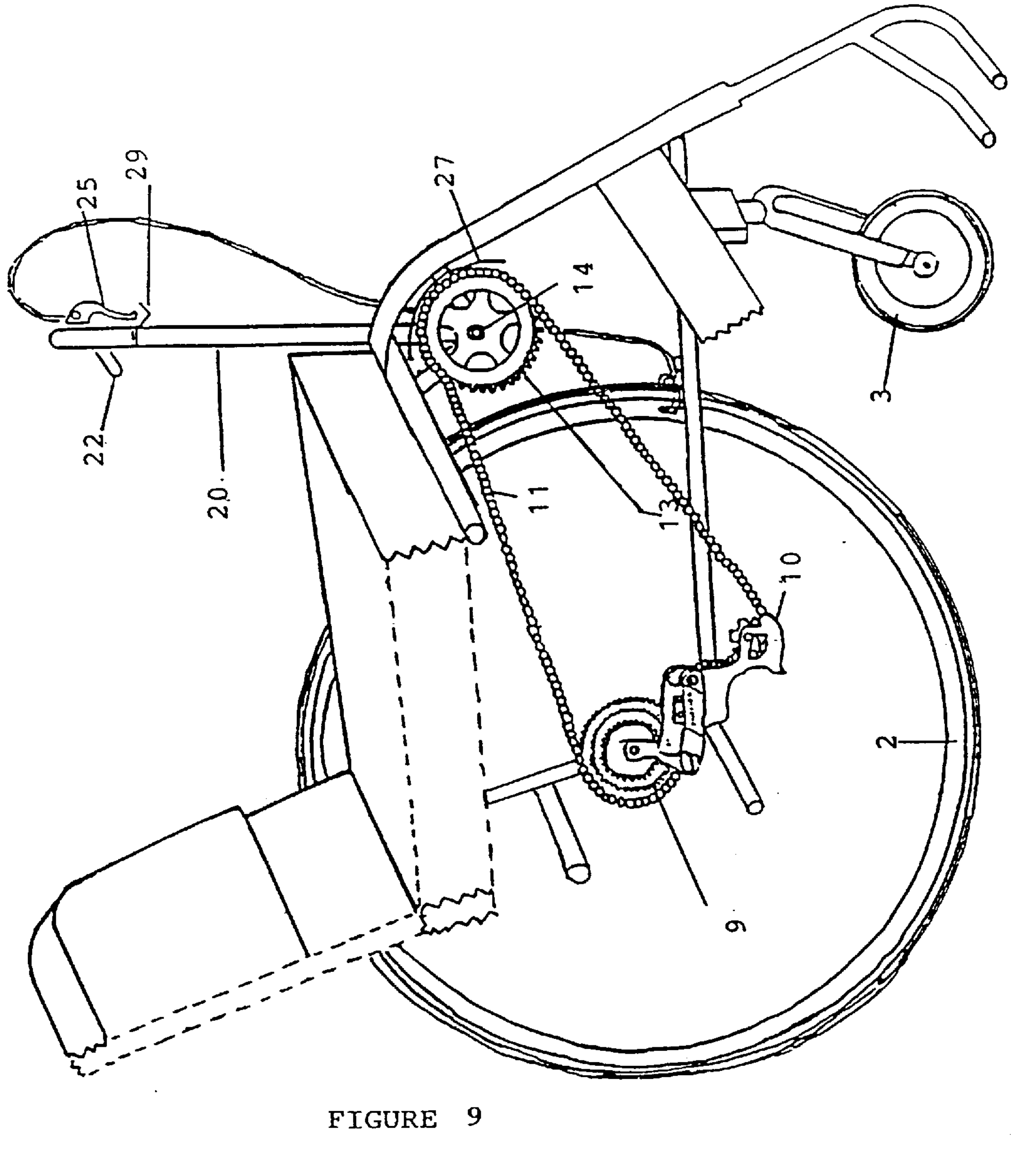
FIG. 9 is a view of the left side of the chair viewed from the center of the chair.
Figure 10:
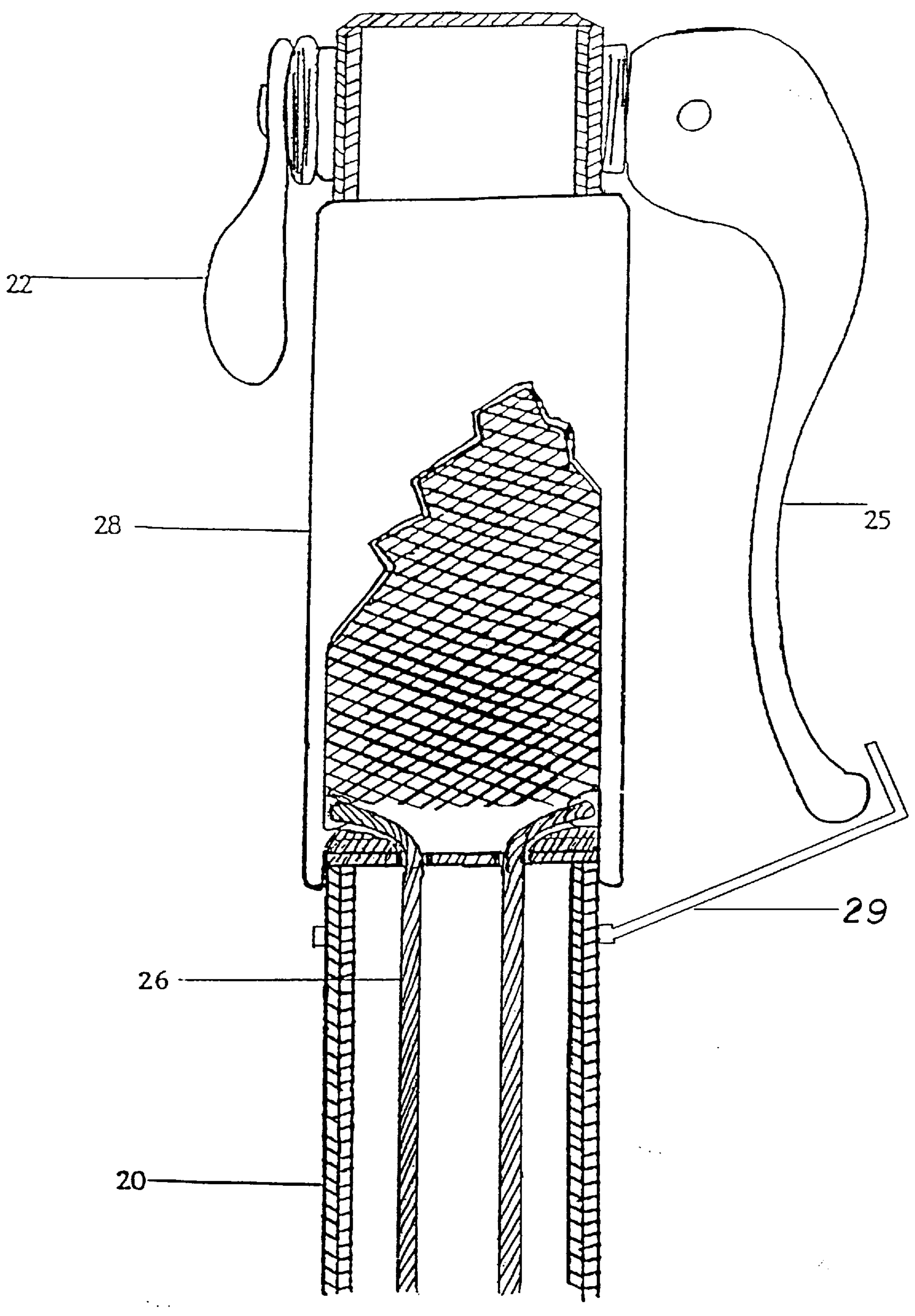
FIG. 10 is a cross section view of the upper end of the push lever showing the shifter, hand brake lever, brake lever retaining clip, ratchet cables, and the rotating hand grip.
Figure 11:
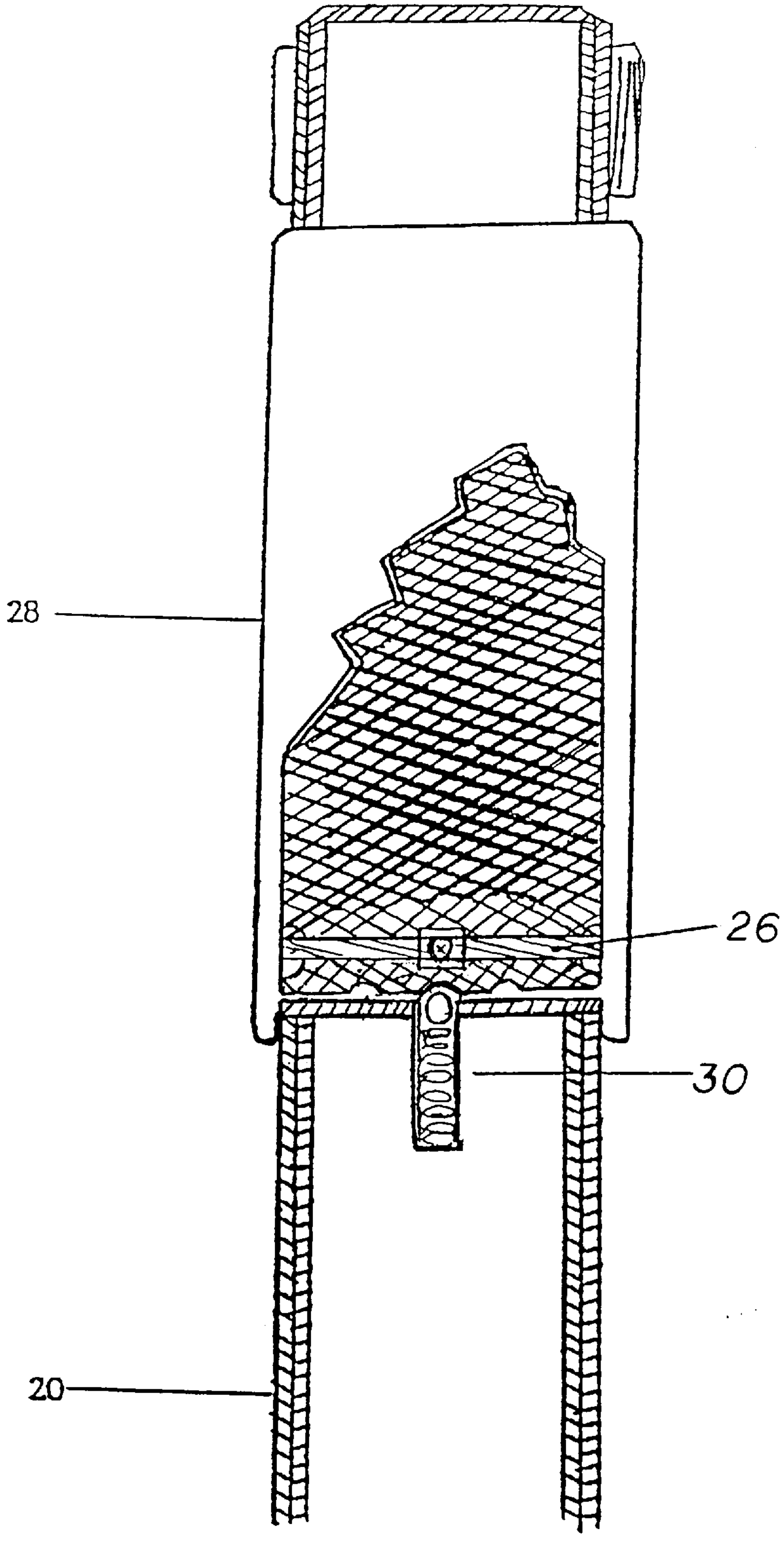
FIG. 11 is a cross section view of the outboard side of the rotating hand grip showing the ratchet cables and spring loaded ball set in the neutral detent position of the hand grip.
Figure 12:
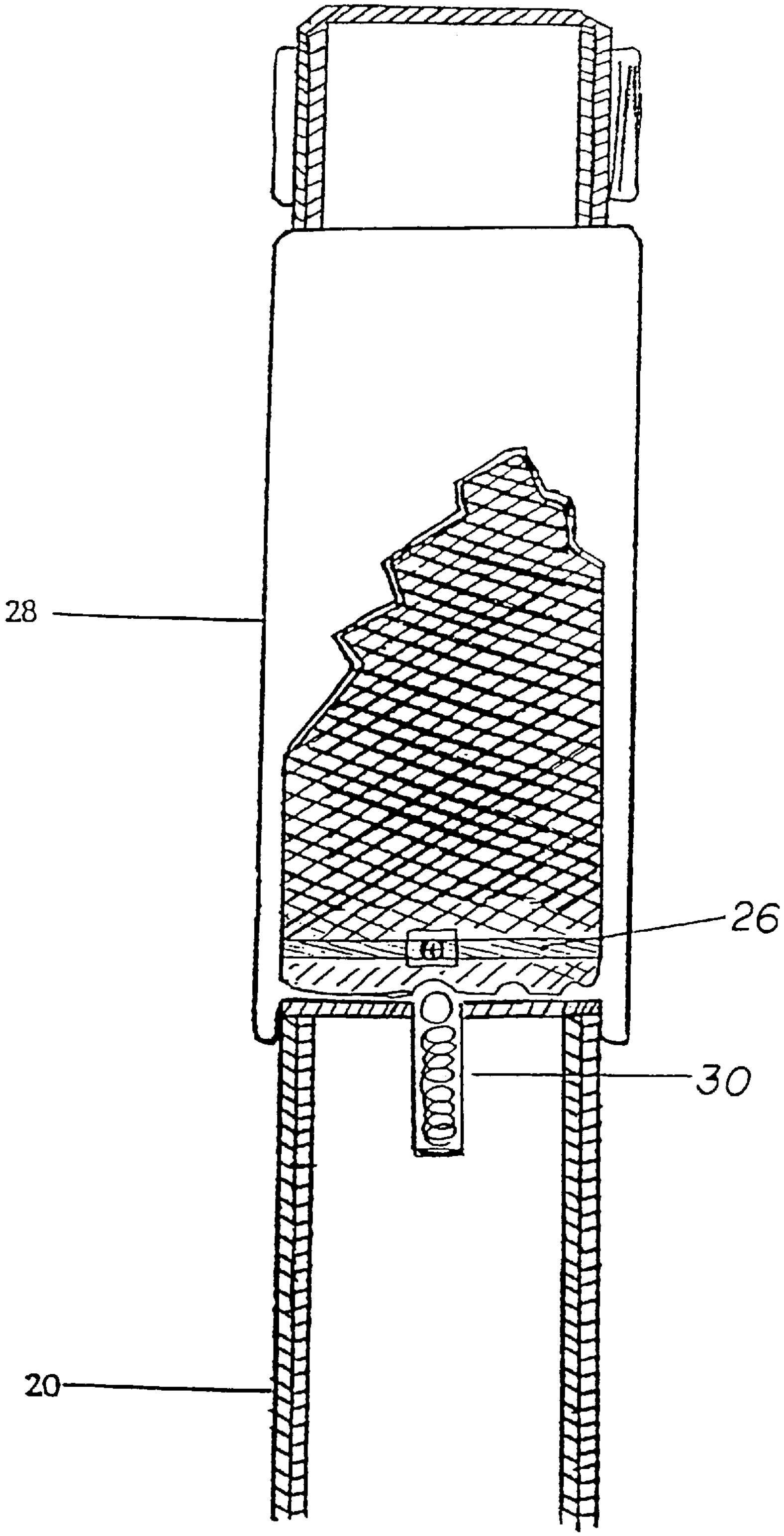
FIG. 12 is a cross section view of the outboard side of the rotating hand grip showing the ratchet cables and the spring loaded ball set in the forward detent position of the hand grip.
Figure 13:
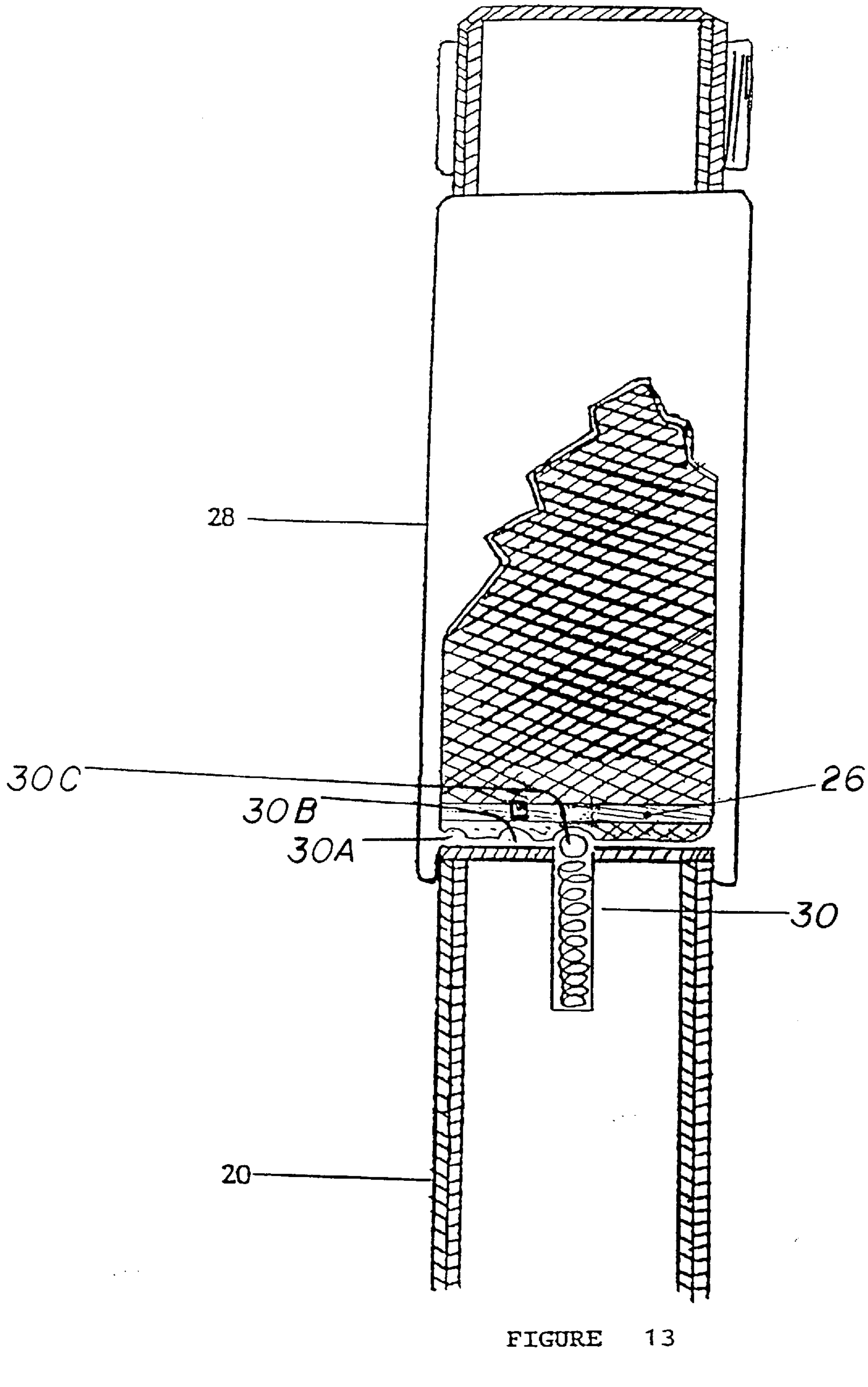
FIG. 13 is a cross section view of the outboard side of the rotating hand grip showing the ratchet cables and the spring loaded ball set in the reverse detent position of the hand grip.

The wheelchair (1) has two large rear wheels (2) and two smaller front casters (3). The large rear wheels are mounted outboard of the frame on rear axles (4). These rear axles are mounted in the left and right rear axle hubs (5) which are incorporated in the frame of the chair on the left and right rear frame uprights (6) below the level of the seat. The axles are supported in the hubs on inner (7) and outer (8) axle bearings. The rear wheels are attached to the axles such that each wheel and axle turn as a unit on the hub bearing.

Inboard to the left and right rear axle hubs, gear clusters (9) are affixed to their respective axles and turn with the axle-wheel units. The specific number of sprockets and the number of teeth on each can be varied within the limitations of space and axle length. Derailers (10) are attached to the frame above and behind each gear cluster to shift the left and right drive chains (11) between rear sprockets (12). Each drive chain is a multi-link, standard bicycle chain that rotates its gear cluster (and axle and wheel) when the corresponding front drive sprocket (13) is rotated by the user. Each front drive sprocket is affixed to a front axle (14), which is supported in its front axle hub (15), on inner (16) and outer (17) bearings. The left and right front hubs are fixed to the frame of the chair below the seat level. Outboard of the chair frame, a ratchet mechanism (18), is attached to each front axle. Each ratchet can be selected to deliver a power stroke, in either the clockwise or counterclockwise direction, by rotating the handgrip (28) at the upper end of the push lever, which, in turn, forces pushrods (26), that are connected through the inner hollow core of the push lever to the ratchet selector (19), up or down, thereby setting the ratchet for forward, neutral, or reverse drive. The ratchets are attached to the push levers (20) that the user pushes straight forward to propel the chair forward. When the ratchet selectors are set for reverse, the user will pull the push levers backwards to move the chair in reverse.

Each derailer moves its drive chain between gear sprockets when the shift cables (21) are tightened or relaxed. The user does this by pushing or pulling on the shifter levers (22). These shifters are attached to the handles of each push lever so that the user can operate them with thumb pressure.

The derailer and shifter on the left side of the chair are typical of those commonly found on a ten-speed bicycle. The derailer and shifter on the right side of the chair are exactly backwards (mirror images) of those on the left side. This allows the user to perform analogous movements with each thumb simultaneously to activate each derailer equally and shift both left and right gears equally.

Each rear wheel has its own cable activated calliper brake (23). The calipers are mounted on the frame below the level of the ratchets, and activated by a brake cable (24). The proximal end of each brake cable is attached to a left or right brake lever (25) which is mounted on the corresponding push lever handle. The user squeezes the brake levers to apply braking force to the rear wheels. Each wheel brake is operated independently, as is each drive wheel.

Sprocket shields (27) are mounted above and in front of each front sprocket to protect the user's legs.

The rear axles are ½ inch in diameter in order to accept most currently produced wheelchair wheels. These wheels are secured to the drive axles in a manner that prevents them from turning independently from the rear axles.

Having thus described the invention, what is claimed and desired to be secured by Letters of Patent is:

1. A wheelchair propulsion apparatus in combination with a wheelchair having a pair of free-moving front caster wheels and a pair of rear drive wheels mounted on rear axles supported in rear hubs and driven by a propulsion apparatus comprising:

two rear axle hubs incorporated in a frame of the chair;

two non-joined rear axles mounted in the hubs on axle bearings;

left and right drive gear clusters mounted on left and right rear wheel axles;

left and right front power sprockets affixed to the axles mounted in axle hubs incorporated in the frame of the chair;

left and right push levers joined to the axles of the front power sprockets through ratchets that can be set to operate in either a clockwise or counterclockwise direction or set in a neutral position;

multi-link chains connecting the front power sprockets to the drive gear clusters;

left-hand and right-hand derailers affixed to the frame to change gears by moving the multi-link chain between individual gear sprockets in the drive gear clusters;

left-hand and right-hand shifter levers affixed to the push rods and connected to the left-hand and right-hand derailers by shifter cables wherein moving the push levers transmits rotational motion to the rear wheels to move the wheelchair in a forward or reverse motion and wherein moving one push lever at a different rate than the other allows the wheelchair to turn.

2. The apparatus according to claim 1 wherein the derailers are controlled by said cables running between the derailers and left-hand and right-hand shifter levers mounted on the push levers.

3. The apparatus according to claim 1 wherein the drive gear clusters and power sprockets are all mounted inboard to the chair frame and below the level of a wheelchair seat.

4. The apparatus according to claim 1 wherein the push levers and ratchets are mounted on the outboard ends of the axles upon which the power sprockets are mounted.

5. The apparatus according to claim 1 wherein the main rear wheels are mounted on the rear axles outboard to the chair frame.

6. The apparatus according to claim 1 wherein cable operated caliper brakes are mounted to the frame adjacent to each rear wheel, and are connected by brake cables to hand brake levers mounted on the push levers to stop the rear wheels when the brake levers are squeezed.

7. The apparatus according to claim 1 wherein the push levers are topped with rotating hand grips, and the push levers encase push rods that connect the hand grips to the ratchets allowing the ratchet rotation direction to be determined by the rotation of the hand grips.

8. The apparatus according to claim 1 wherein the right-hand derailer is an exact mirror image of the left-hand side derailer.

9. The apparatus according to claim 1 wherein the right-hand shifter lever is an exact mirror image of the left-hand side shifter lever.

* * * * *